United States Patent [19]

Hadermann et al.

[11] 3,893,904

[45] July 8, 1975

[54] ELECTROOSMOTIC PRESSURE CELL

[76] Inventors: Albert F. Hadermann, Rt. 1, Ijamsville, Md. 21754; Paul F. Waters, 3318 45th St., Northwest, Washington, D.C. 20016; Jung Woo Woo, 2008 N. Adams, Arlington, Va. 22201

[22] Filed: July 2, 1973

[21] Appl. No.: 375,515

[52] U.S. Cl................. 204/301; 204/180 R; 310/2
[51] Int. Cl............................................ B01d 13/02
[58] Field of Search ........... 204/180 P, 180 R, 151, 204/301; 73/516 LM; 310/2

[56] References Cited
UNITED STATES PATENTS

| | | | |
|---|---|---|---|
| 2,615,940 | 10/1952 | Williams | 73/516 LM |
| 2,661,430 | 12/1953 | Hardway, Jr. | 310/2 |
| 2,824,292 | 2/1958 | Christoph | 310/2 X |
| 3,050,665 | 8/1962 | Hurd | 204/301 X |
| 3,065,365 | 11/1962 | Hurd et al. | 310/2 |

*Primary Examiner*—John H. Mack
*Assistant Examiner*—A. C. Prescott
*Attorney, Agent, or Firm*—Joseph P. Nigon

[57] ABSTRACT

An electroosmotic pressure cell capable of generating pressures of more than 4 atmospheres at a current comsumption of about 10 microamperes is disclosed.

5 Claims, 4 Drawing Figures

ELECTROOSMOTIC PRESSURE CELL

BACKGROUND OF THE INVENTION

This invention relates to electroosmotic pressure cells of improved construction and a hitherto unrecognized and unappreciated physical basis for use at very high (e.g., 50kV) voltages and capable of generating very high pressures (e.g., 4 or more atmospheres of pressure) at low current consumption (e.g., 10 microamperes).

It has been shown (2) that the expression for the field dependence of a concentration of ions stemming from the dissociation of the weak electrolyte, e.g., water, may be incorporated into an appropriate solution for the electrical double layer thickness which is a suitable solution of the Poisson-Boltzmann equation for the direction normal to the surface of a particle. Combining this solution for a 1:1 electrolyte with the equation for the electroosmotic pressure yields the expression:

$$P = 1.334 \times 10^{-2} \frac{fV}{c\Gamma^2} \left( \frac{N_o k T D c}{\pi} \right)^{1/2}$$

where $f$ is $\delta/N_o C$
and $\delta$ is the charge density in esu/cm$^2$, $N_o$ is the Avagadro number, and $c$ is the concentration of the ion which is preferentially adsorbed below the surface of shear. $f$ has been given the name "electrostatic adsorption moment" and depends on the nature of the solid substrate and the weak electrolyte. $V$ is the potential difference in volts, $k$ is the Boltzmann constant, $D$ is the dielectric constant of the diffuse portion of the electrical double layer, $c$ is the concentration defined by Equation (1), $e$ is the electronic charge in esu/electron and $\Gamma$ is the mean hydraulic radius of the powdered solid substrate.

BRIEF DESCRIPTION OF THE INVENTION

We have developed an electroosmotic pressure cell capable of generating pressures of 4 atmospheres or more at low current consumption. The cell utilizes a weak electrolyte in the porous region which disassociates in an intense electric field.

The present invention can be used as a pressure source for vapor pressure and membrane osomometers for the characterization of polymers, in pumps (including heart pumps and other pumps for the moving of fluids) and as a pressure source in a microviscometer for viscosity determinations on small samples of fluids.

DETAILED DESCRIPTION OF THE INVENTION

The very high pressures which are generated by the present invention appear only in the presence of a weak electrolyte in the porous region, e.g., water, which disassociates in the intense electric field according to the equation which is given by:

$$C = \alpha_o c_o \left( 1 + 4.818 \frac{E}{D' T^2} + .4015 \frac{E^2}{D'^2 T^4} + ... \right) \quad (1)$$

where $c$ is the concentration of ions, $\alpha_o$ is the degree of disassociation, $c_o$ is the concentration of the weak electrolyte, $E$ is the field strength in the region of electroosmotic activity, $D$ is the dielectric constant of the fluid in the porous region and $T$ is the absolute temperature.

The pressures which are observed when the weak electrolyte, e.g., water, is present in the void space containing a polar liquid, e.g., isopropanol, are much larger than pressures derived from dry systems. This is shown by comparing A and B of FIG. 1 where pressure/voltage vs. kilovoltage is plotted for a wet system (A) and a dry system (B). This connection between the magnitude of the pressure and the presence of a weak electrolyte was not exploited in the prior art. The corresponding current/voltage vs. voltage curves are presented in A and B of FIG. 2. The system with the added weak electrolyte (A) is more efficient in terms of pressure vs. I$^2$R heating than cells of the prior art. Also, the pressures generated are much larger than it is possible to obtain using systems employing the prior art. Since a large portion of the current which does not flow through the present invention is electronic, there is negligible electrolytic degradation of the cell contents, and no evidence of the formation of gas. Thus, the system is time and voltage stable and redox electrode systems are not required as is the case with the cells of the prior art, i.e., U.S. Pat. No. 3,143,691. Electrolytic degradation effects at the electrodes are also negligible if inert, e.g., platinum, electrodes are used. Due to the high voltages which are employed, the conductivities of the liquid regions within the cell are very much greater than the resistivity of the liquid/solid region of electroosmotic activity, thus the liquid junction with the porous region effectively defines the physical extension of the electrodes. This eliminates the need for the porous electrodes of prior art devices placed in proximity to the region of electroosmotic activity and, thus, leads to a simplified electrode design. The cell which is the object of this invention also differs from the cells of the prior art in that the electroosmotic pressure generated when a weak electrolyte, e.g., water, is present in the void volume is a very strong non-linear rather than a weak linear function of the applied potential as shown by the finite slope of A in FIG. 1. When weak electrolyte is absent from the region of electroosomotic pressure the pressures which are obtained are much smaller linear functions of the applied potential as shown by B of FIG. 1; consistent with inventions incorporating prior art.

SPECIFIC DATA ON FIGS. 1 AND 2

Figure 1:
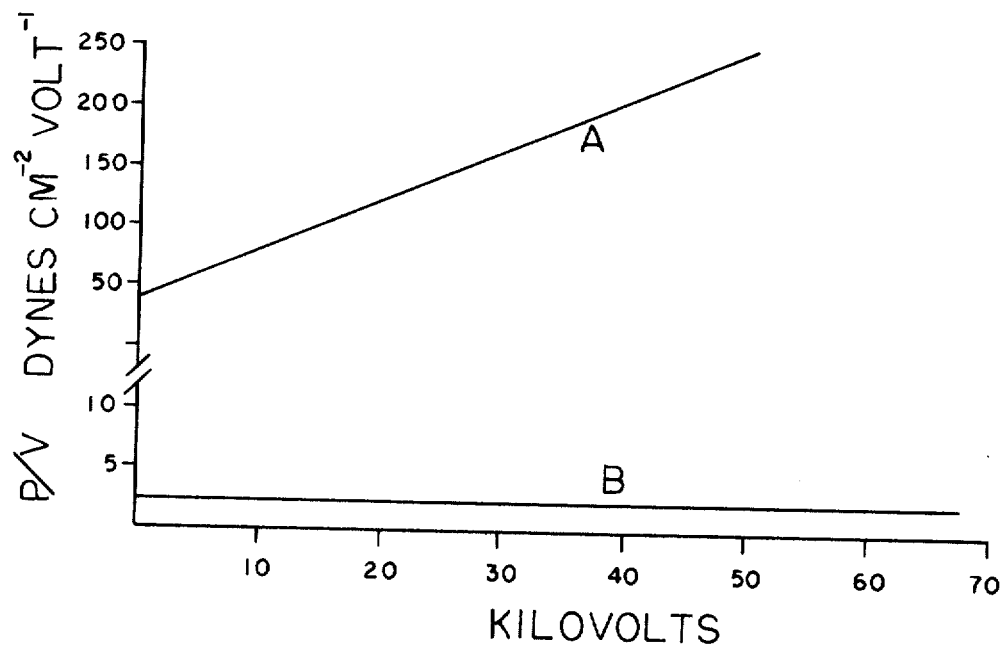
FIG. 1 is a plot of the pressure/voltage vs voltage relationship for wet and dry systems.
Figure 2:
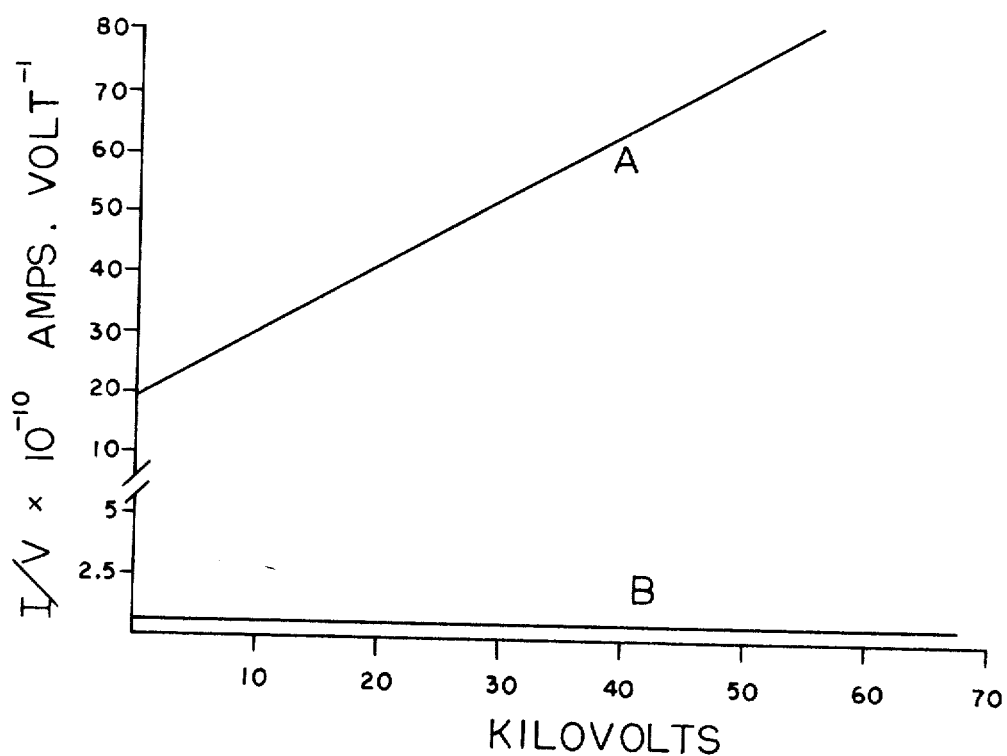
FIG. 2 is the corresponding current/voltage vs voltage curves.

A of FIGS. 1 and 2 refers to data obtained from an electroosmotic system comprised of a 2.00 gram sample of Merck $\tau$ alumina which had a mean particle size of approximately 2$\mu$ and an initial water plus aluminol hydroxyl content of 5.14 wt. %. The sample was then heated in air for 2 hours at 130°C. After cooling, isopropanol was added.

B of FIGS. 1 and 2 refers to data obtained from an electroosmotic system comprised of a 2.00 gram sample of Merck $\gamma$-alumina which had a mean particle size of approximately 2$\mu$ and an initial water content plus aluminol hydroxyl content of 5.14 wt. %. The sample was then subjected to thermal treatment for 45.5 hours at 400°C and evacuated at $7 \times 10^{-5}$ torr. Many other systems occupying intermediary positions between A and B locations may be prepared through the use of less extreme procedures. The isopropanol in B contained less than 10 parts per million of water.

DESCRIPTION OF THE PREFERRED EMBODIMENTS

Figure 3:
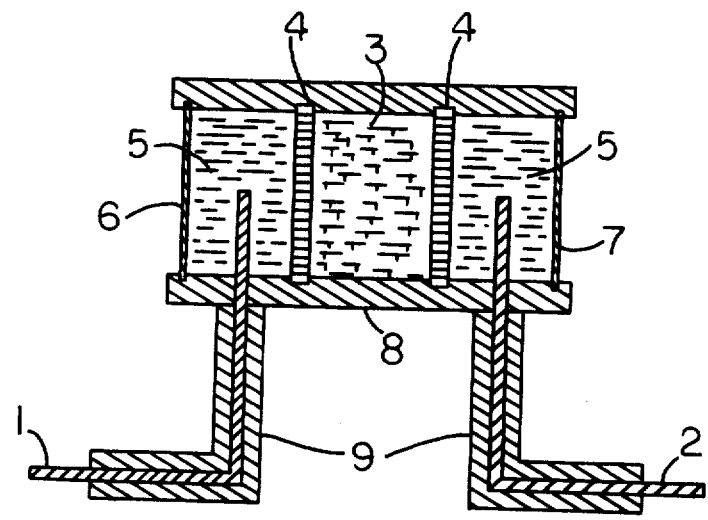
FIG. 3 illustrates one embodiment of the invention.

The operation of the invention may be appreciated by referring to FIG. 3. When a potential difference between zero and more than 75 kV is applied to electrodes, 1, and, 2, the strong electric field in the liquid/solid region, 3, between the porous, insulating frits, 4, promotes the disassociation of the weak electrolyte in region 3 and the polar fluid within electrode compartments, 5, is displaced. The fluid displacement stems from the preferential adsorption of one of the ions involved in the field-assisted disassociation by the solid substrate, e.g., $\gamma$-alumina. Trapping of the ions below the surface of shear, i.e., $f$ 0, leads to the development of a net space charge in the mobile polar liquid in region 3. As a consequence of the space-charging of the fluid in the liquid/solid region, $e$, the fluid is displaced toward the electrode compartment of opposite sign and a difference of pressure is established across the cell causing one of the deformable, insulating end partitions 6, to move outward and the other, 7, moves inward. Thus, the electroosmotic system can be employed wherever it is desired to have a source of positive or negative pressure which is a function of the applied electrical potential. Since high voltages are applied to the electrodes it is necessary that the housing, 8, the end partitions, 6 and 7, and the potting of the input terminals to the electrodes, 9, be of an insulating nature.

Figure 4:
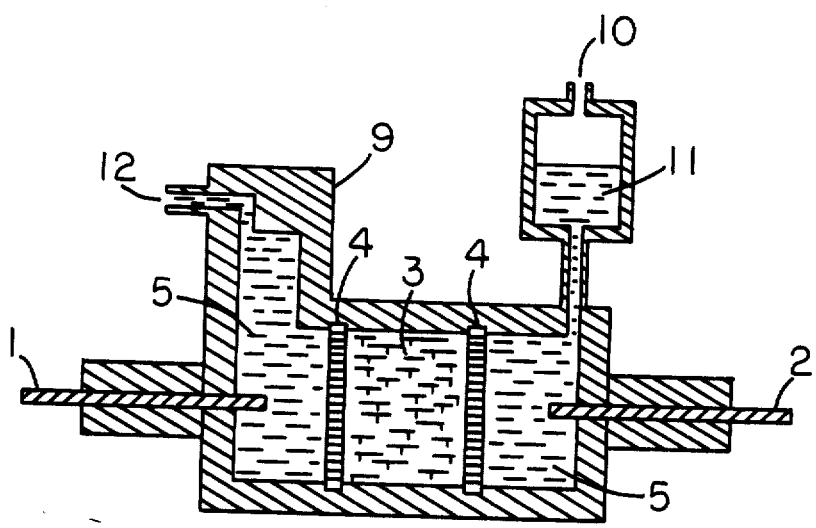
FIG. 4 illustrates a second embodiment of the invention.

An alternate embodiment of the present invention is illustrated in FIG. 4. When a potential difference between zero and more than 75 kV is applied to electrodes, 1, and 2, the field-assisted disassociation and space-charging of the liquid occurs in the liquid/solid region, 3, between frits, 4, and a pressure difference is established across the cell resulting in the displacement of fluid from reservoir, 11, into chambers, 5, and region, 3. Dry air is drawn in on the low pressure side at the vent, 10, on the reservoir, 11, thus permitting net displacement of the fluid 5, through port, 12, to the system or device to be pressurized. The insulating material, 9, provides a housing for the pressure source.

What is claimed is:

1. An electroosmotic cell, capable of use at voltages in the kilivolt range and capable of generating very high pressures, comprising a housing having flexible diaphragms on opposite sides thereof, two porous frit walls dividing the cell into three chambers, said wall of a coarse, porous insulating frit; a nonaqueous polar liquid containing a field-dissociable weak electrolyte, and a pair of platinum electrodes in the electrode compartments.

2. An electroosmotic cell, capable of use at voltages in the kilivolt range and capable of generating very high pressures, comprising a housing, containing a porous frit wall dividing the cell into three chambers, one of said three chambers comprising a low pressure side and one of said three chambers comprising a high pressure side, a source of dry air connected to said low pressure side, a port connected to the high pressure side, and a pair of platinum electrodes in the electrode compartments.

3. The electroosmotic cell according to claim 1 wherein the weak electrolyte in the chambers comprises water, acetic acid or propionic acid in an non-aqueous polar liquid.

4. The electroosmotic cell according to claim 1 wherein the porous insulating frit is gamma alumina, silica or glass.

5. The electroosmotic cell according to claim 1 wherein the polar liquid is isopropynal.

* * * * *